United States Patent [19]

Yang

[11] Patent Number: 5,339,233
[45] Date of Patent: Aug. 16, 1994

[54] LAMP ASSEMBLY

[76] Inventor: Roger Yang, 2F No. 21, Pao-Ching St., sung Shan, Taipei, Taiwan

[21] Appl. No.: 61,585

[22] Filed: May 12, 1993

[51] Int. Cl.⁵ .............................................. F21V 21/18
[52] U.S. Cl. .................... 362/402; 362/345; 362/413; 362/414; 362/426; 362/427
[58] Field of Search ............... 362/345, 402, 413, 414, 362/426, 427

[56] References Cited

U.S. PATENT DOCUMENTS

| | | | |
|---|---|---|---|
| 2,090,439 | 8/1937 | Carwardine | 362/413 |
| 3,188,460 | 6/1965 | Thorsen et al. | 362/401 |
| 3,239,184 | 3/1966 | Kirkeby | 362/401 |
| 3,543,019 | 11/1970 | Jacobsen | 362/402 |
| 4,080,530 | 3/1978 | Krogsrud | 362/427 |

Primary Examiner—Ira S. Lazarus
Assistant Examiner—Sara Sachie Raab
Attorney, Agent, or Firm—Pro-Techtor International

[57] ABSTRACT

A lamp assembly including a mid-angle trapezoidal open frame having four corners pivotably connected to an upper arm, an upper wiring tube, a lower arm, and a lower wiring tube, a triple-terminal connecting frame pivotably connected to the upper arm and the upper wiring tube to hold a lamp shade, swivel device revolvably fastened to an axle holder on a lamp stand to hold the lower arm and the lower wiring tube, a first retaining spring assembly to adjustably hold the lower arm and the lower wiring tube in a desired angle, and a second retaining spring assembly to adjustably hold the upper arm and the upper wiring tube in a desired angle.

3 Claims, 3 Drawing Sheets

LAMP ASSEMBLY

BACKGROUND OF THE INVENTION

The present invention relates to a lamp assembly which can be conveniently adjusted to move the lamp bulb to any desired angle.

A variety of lamp assemblies may be used for different purposes. Because regular lamp assemblies are specifically designed for respective purposes, different lamp assemblies may have to be used for different purposes. For example, a wall lamp is specifically designed for mounting on the wall and not suitable for use on the desk. Further, the supporting frame of a lamp assembly is commonly made adjustable so that the lamp bulb can be moved to any of a variety of desired angles. However, the adjusting mechanism of the supporting frame of the conventional lamp assemblies is commonly complicated to adjust.

SUMMARY OF THE INVENTION

One object of the present invention is to provide a lamp assembly which can be conveniently adjusted in the directions of the axes of X, Y, and Z to move the lamp bulb to any desired angle. Another object of the present invention is to provide a lamp assembly which can be alternatively used as a wall lamp or a desk lamp. According to the preferred embodiment of the present invention, a mid-angle trapezoidal open frame is used to connect the upper arm and the upper wiring tube to the lower arm and the lower wiring tube, a swivel device is used to connect the lower arm and the lower wiring tube to the lamp stand by an axle holder, and a triple-terminal connecting frame is used to connect the lamp shade to the upper arm and the upper wiring tube, and therefore the lamp shade supporting frame of the lamp assembly can be adjusted in the directions of the axes of X, Y, and Z. Spring coils, fixed rings, movable rings, and stop loops are used to hold the upper arm and the upper wiring tube as well as the lower arm and the lower wiring tube in position once they have been adjusted to the desired angles.

DETAILED DESCRIPTION OF THE PREFERRED EMBODIMENT

Figure 1:
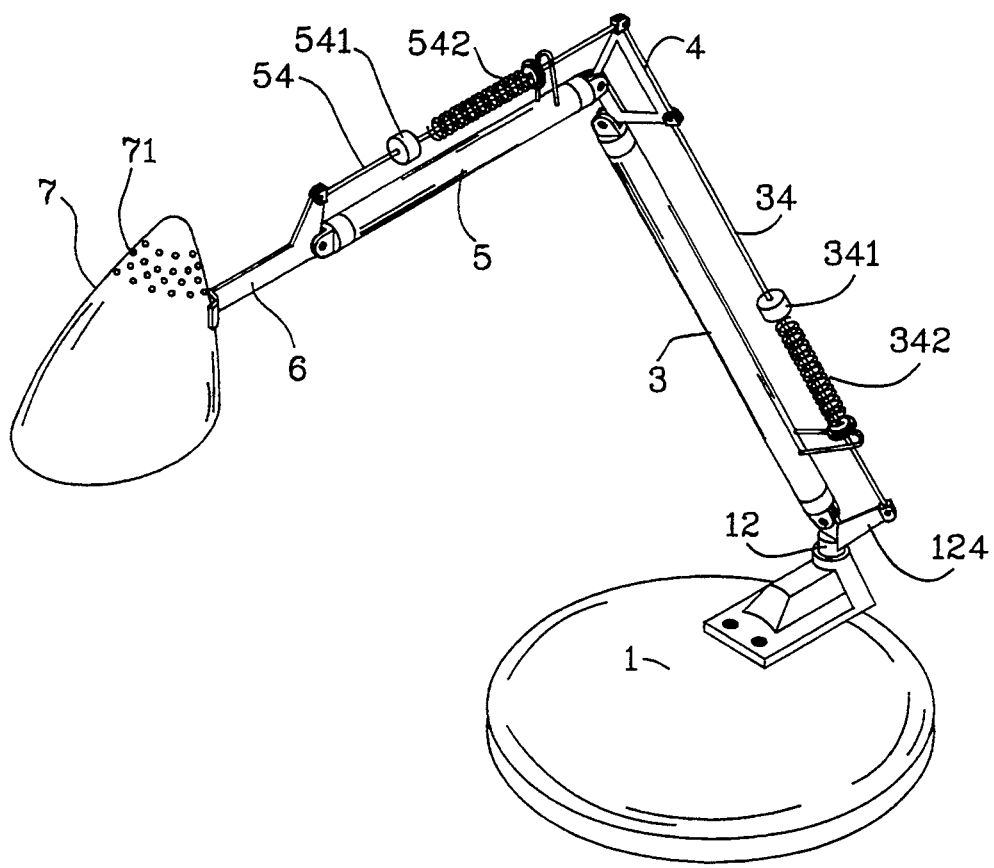
FIG. 1 is a perspective oblique view of a lamp assembly constructed according to the preferred embodiment of the present invention.
Figure 2:
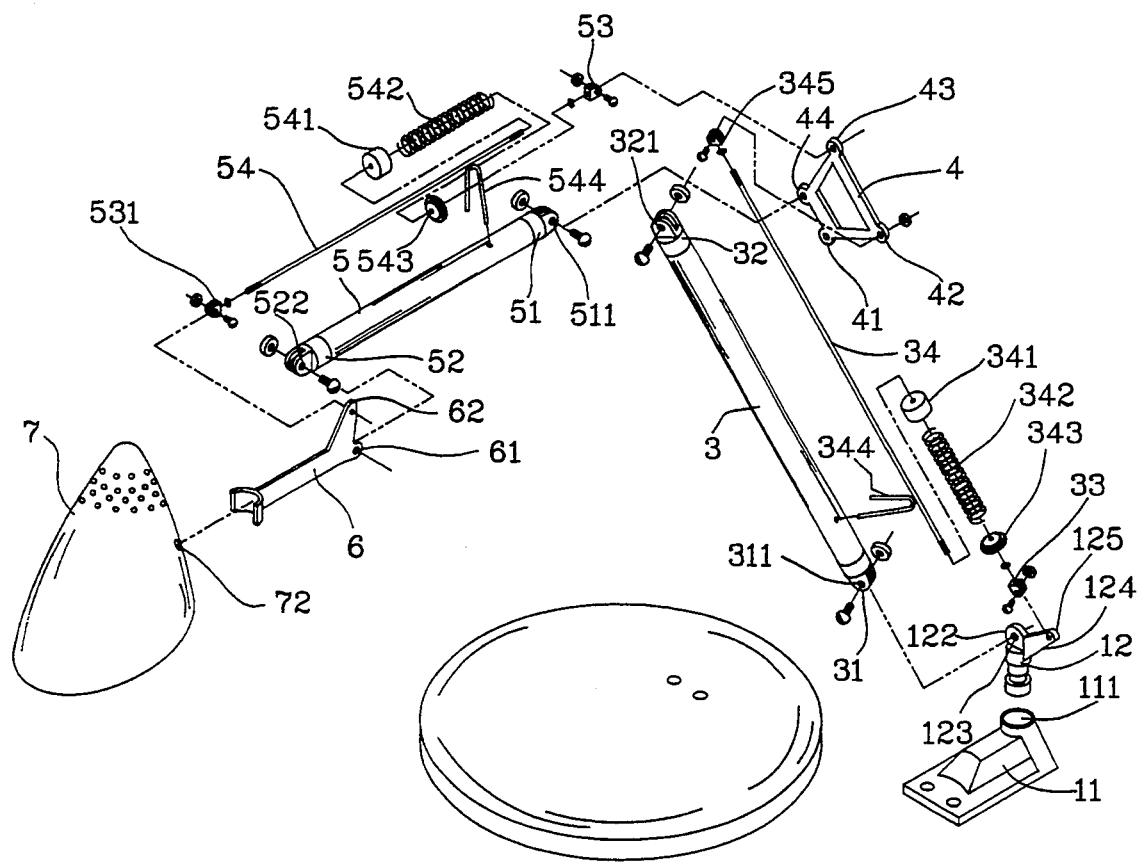
FIG. 2 is a perspective exploded view of the lamp assembly.
Figure 3:
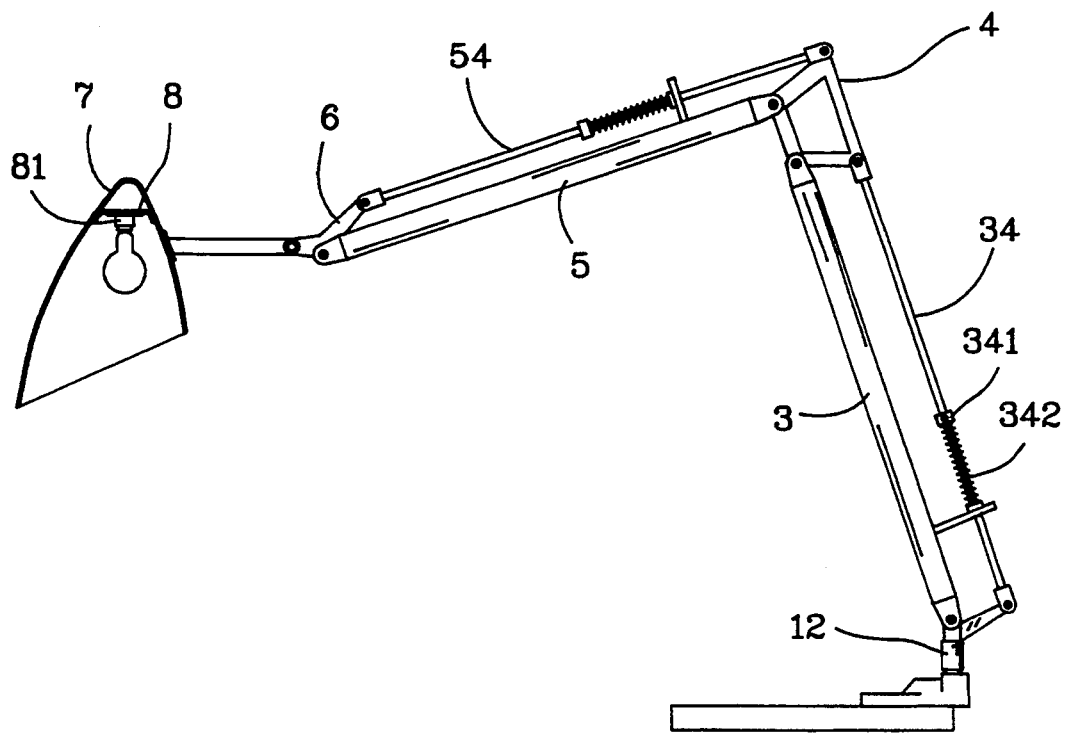
FIG. 3 is a perspective side view of the lamp assembly.

Referring to FIGS. 1, 2 and 3, an axle holder 11 is fastened to a stand 1 to hold a swivel device 12. The swivel device 12 has a bottom end inserted in a top axle hole 111 on the axle holder 11 and is revolvably fastened thereto. The swivel device 12 comprises an arched upright support 122 with a center through hole 123, and a bevel frame 124 with a pin hole 125 extended from the arched upright support 122 at one side. A lower arm 3 is pivotably connected to the arched upright support 122. The bottom lamp rod 3 has two forked connectors, namely, the bottom forked connector 31 and the top forked connector 32 on two opposite ends thereof. By inserting a screw through a pin hole 311 on the bottom forked connector 31 and the center through hole 123 on the arched upright support 122 and locking the screw with a screw nut, the lower arm 3 is pivoted to the swivel device 12. An upper arm 5 is pivotably connected to the lower arm 3 by a trapezoidal open frame 4 to hold a lamp shade 7. The trapezoidal open frame 4 has pin holes, namely, the first pin hole 41 on one top corner thereof, the second pin hole 42 on one bottom corner thereof near the first pin hole, the third pin hole 43 on the other bottom corner thereof, and the fourth pin hole 44 on the other top corner thereof. The top forked connector 32 has a pin hole 321 to which the first pin hole 41 of the trapezoidal open frame 4 is pivotably connected by a screw and screw nut. The upper arm 5 is similar in structure to the lower arm 3, having a bottom forked connector 51 with a pin hole 511 and a top forked connector 52 with a pin hole 521. The pin hole 511 of the bottom forked connector 51 is pivotably connected to the fourth pin hole 44 by a screw and screw nut. There is a lower wiring tube 34 having a bottom end connected to the pin hole 125 on the bevel frame 124 by a connecting member 33 and a top end connected to the second pin hole 42 by a connecting member 345. A stop loop 344 is fastened to the lower arm 3 around the lower wiring tube 34. A spring coil 342 is sleeved on the lower wiring tube 34 and stopped between a fixed ring 341 and a movable ring 343 on the lower wiring tube 34. The movable ring 343 is stopped at the stop loop 344. The top forked connector 52 of the upper arm 5 is connected to the lamp shade 7 by a triple-terminal connecting frame 6. The triple-terminal connecting frame 6 has a first terminal 61 pivotably connected to the top forked connector 52 of the upper arm 5, a second terminal 62 pivotably connected to an upper wiring tube 54 by a connecting member 531, and a third terminal fixed to screw holes 72 on the lamp shade 7. The opposite end of the upper wiring tube 54 is pivotably connected to the third pin hole 43 on the trapezoidal open frame 4 by a connecting member 53. A stop loop 44 is fastened to the upper arm 5 around the upper wiring tube 54. A spring coil 542 is sleeved on the upper wiring tube 54 and stopped between a fixed ring 541 and a movable ring 543 on the upper wiring tube 54. The movable ring 543 is stopped at the stop loop 544. Therefore, the lamp shade 7 can be adjusted in the directions of the axes of X, Y and Z by turning the swivel device 12 on the axle holder 12 and, by pivoting the triple-terminal connecting frame 6 on the upper arm 5 and the upper wiring tube 54, the upper arm 5 and the upper wiring tube 54 on the lower arm 3 and the lower wiring tube 34, and the lower arm 3 and the lower wiring tube 34 on the swivel device 12 respectively.

Referring to FIGS. 2 and 3 again, the lamp shade 7 has holes 71 for dissipation of heat. A lamp socket mount 8 is fastened inside the lamp shade 7 to hold a lamp socket 81 for a lamp bulb. There is an electric circuit having one end connected to the lamp socket 81 and an opposite end connected with an electric plug extended out of the lamp assembly for connecting to an external power supply outlet. This electric circuit is of the known art and not within the scope of the present invention, and therefore it is neither shown nor described in detail. When the lamp shade 7 is adjusted to a desired angle, the lamp assembly becomes firmly retained in position by means of the spring force of the spring coils 342;542.

Further, the axle holder 11 may be detached from the stand 1 and then fixed to the wall so that the lamp assembly is used as a wall lamp. Alternatively, the axle holder 11 may be fastened to the desk by a clamp assembly.

I claim:

1. A lamp assembly comprising:

a lamp stand;

an axle holder detachably fastened to said lamp stand by screws, said axle holder having an axle hole in a top surface;

a swivel device having a stub bottom shaft revolvably fastened to said axle hole on said axle holder, and an arched upright support, said arched upright support comprising a bevel frame obliquely extended upwards at one side;

a lamp shade having holes for dissipation of heat and a socket mount to hold a lamp socket;

a mid-angle trapezoidal open frame having a pin hole on each corner thereof;

a lower arm having a first forked connector at one end pivotably connected to said arched upright support and a second forked connector at an opposite end pivotably connected to a first of said pin holes of said mid-angle trapezoidal open frame;

a lower wiring tube having a bottom end pivotably connected to said bevel frame of said swivel device by a connecting member and a top end pivotably connected to a second of said pin holes of said mid-angle trapezoidal open frame;

a first retaining device to adjustably hold said lower arm and said lower wiring tube to said swivel device in a desired angle, said first retaining device comprising a stop loop fastened to said lower arm around said lower wiring tube, a spring coil sleeved on said lower wiring tube and stopped between a fixed ring and a movable ring on said lower wiring tube, the movable ring being stopped at the stop loop;

a triple-terminal connecting frame having a first terminal, a second terminal, and a third terminal, said third terminal being fixed to said lamp shade;

an upper arm having a first forked connector at one end pivotably connected to a fourth of said pin holes of said mid-angle trapezoidal open frame and a second forked connector pivotably connected to said first terminal of said triple-terminal connecting frame;

an upper wiring tube having a bottom end pivotably connected to a third of said pin holes of said mid-angle trapezoidal open frame by a connecting member and a top end pivotably connected to said second terminal of said triple-terminal connecting frame by a connecting member; and a second retaining device to adjustably hold said upper arm and said upper wiring tube to said lower arm and said lower wiring tube in a desired angle, said second retaining device comprising a stop loop fastened to said upper arm around said upper wiring tube, a spring coil sleeved on said upper wiring tube and stopped between a fixed ring and a movable ring on said second retaining device being stopped at the stop loop on said upper arm.

2. The lamp assembly of claim 1 wherein:

said axle holder is fixed to a wall so that the lamp assembly is used as a wall lamp.

3. The lamp assembly of claim 1 wherein:

said axle holder is fixed to a desk so that the lamp assembly is used as a desk lamp.

* * * * *